United States Patent [19]

Flores

[11] Patent Number: 4,597,631

[45] Date of Patent: Jul. 1, 1986

[54] PRINTED CIRCUIT CARD HYBRID

[75] Inventor: Arnold Flores, San Diego, Calif.

[73] Assignee: The United States of America as represented by the Secretary of the Navy, Washington, D.C.

[21] Appl. No.: 446,295

[22] Filed: Dec. 2, 1982

[51] Int. Cl.[4] ................................................ G02B 6/36
[52] U.S. Cl. ............................ 350/96.20; 350/96.21; 350/96.22
[58] Field of Search ............... 350/96.20, 96.21, 96.22; 339/17 LC, 65, 66, 186

[56] References Cited

U.S. PATENT DOCUMENTS

| | | | |
|---|---|---|---|
| 3,951,514 | 4/1976 | Medina, Jr. | 350/96.22 |
| 4,084,882 | 4/1978 | Hogan et al. | 350/96.2 |
| 4,268,114 | 5/1981 | d'Auria et al. | 350/96.2 |
| 4,449,784 | 5/1984 | Basov et al. | 350/96.21 |
| 4,461,537 | 7/1984 | Raymer, II et al. | 350/96.20 |
| 4,465,333 | 8/1984 | Caserta et al. | 350/96.20 |
| 4,470,660 | 9/1984 | Hillegonds et al. | 350/96.21 |

FOREIGN PATENT DOCUMENTS 2086073  5/1982  United Kingdom ............... 350/96.2

OTHER PUBLICATIONS

Uberbacher, *IBM Tech. Disc. Bull.*, vol. 18, No. 2, Jul. 1975, "Optical Connection for LSI Electrical Circuits", pp. 485-486.
Ephraim et al., *IBM Tech. Disc. Bull.*, vol. 22, No. 5, Oct. 1979, "Transceiver Module Assembly", pp. 2077-2078.
Cefarelli et al., *IBM Tech. Disc. Bull.*, vol. 21, No. 4, Sep. 1978, "Optical Circuit Module Connector", pp. 1568-1570.
Schmid, *Electronics*, vol. 49, No. 18, Sep. 2, 1976, "Fiber-Optic Data Transmission . . . ", pp. 94-99.
Albanese et al., *The Bell System Tech. Journal*, vol 58, No. 3, Mar. 1979, "LED Array Package for Optical Data Links", pp. 713-720.

*Primary Examiner*—William L. Sikes
*Assistant Examiner*—Frank González
*Attorney, Agent, or Firm*—R. F. Beers; E. F. Johnston; Harvey Fendelman

[57] ABSTRACT

A hybrid connector is presented whereby both electrical and fiber optic cables are connected to a printed circuit card. The connector consists of a female half which contains a plurality of fiber optic contact inserts molded into the connector, and also female electrical connections. The male half of the connector is an integral part of a printed circuit card constructed to contain male fiber optical contact inserts in addition to the standard plated electrical male type contact points. Both halves of the connector may be fitted with removable and interchangeable fiber optic contacts, radio frequency contacts, and/or power pins in addition to the standard printed circuit car contacts for wire wrap or solder connections. The printed circuit card hybrid fiber optic connector presented here provides normal card installation and removal of fiber optic interconnects from standard card cages or mother boards without threading or other special engaging mechanisms.

9 Claims, 3 Drawing Figures

4,597,631

PRINTED CIRCUIT CARD HYBRID

PRINTED CIRCUIT CARD HYBRID FIBER OPTIC CONNECTOR

Statement of Government Interest

The invention described herein may be manufactured and used by or for the Government of the United States of America for governmental purposes without the payment of any royalties thereon or therefor.

BACKGROUND OF THE INVENTION

The development of fiber optic techniques for transmitting wideband signals along strands of fiber optical materials has revolutionized the information transmitting fields. Standard methods of transmitting information in electronic circuits has evolved around the electromagnetic transmission of radio frequency or similar signals along electrical conducting paths. A myriad of connectors and contacts have been developed and standardized for such electrical conducting techniques. Presently, methods of connecting fiber optic cables are being developed. These methods have yet to be completely standardized.

In particular, the construction of electronic circuits of varying degrees of sophistication on printed circuit boards is well developed. Methods of interconnecting externally originated conductors to make contact with corresponding conductors on the printed circuit boards have been well developed and standardized. Various types of connectors have been developed for connection with flat printed circuit cards which have been designed to mount in standardized racks.

Present methods in fiber optic techniques have expanded to where optical signals can be converted into electrical signals with the interfacing, or transduction, occurring in special units attached to the printed circuit cards. The problem arises of obtaining a connector to the printed circuit card that will interconnect fiber optic circuits on the printed circuit card with incoming fiber optic cables bringing signals to the card or, possibly, transmitting signals from the card. In particular, techniques have been developed wherein both electrical connections and fiber optic connections can be made to printed circuit cards. Such presently designed connections are usually cumbersome, bulky and heavy. Often these methods of hybrid connectors are nothing more than two separate connectors, one for the electrical connections and the second for the optical connections, fastened together in a manner that clearly displays the distinct character of the separate types of connectors.

SUMMARY OF THE INVENTION

This invention is in the area of a printed circuit card hybrid fiber optic/electrical connector. In particular, it presents a hybrid connecting device which incorporates integral connections for both electrical and optical conductors from externally originated cables to receptacles incorporated on the printed circuit cards.

The printed circuit card hybrid fiber optic connector presented here consists of a separate female half which contains standard state-of-the-art removable and interchangeable fiber optic contacts, radio frequency contacts and/or power pins in addition to the standard printed circuit card contacts for wire wrap or solder connections. The male half of the connector is an integral part of the printed circuit card. The fiber optic portion can also be removable from the printed circuit card and can contain standard state-of-the-art interchangeable contacts.

This hybrid connector is a lightweight integrated unit containing both fiber optic connectors and ordinary electrical contact connectors. In regards to using the hybrid printed circuit card with standard rack mounting, the hybrid connector does not require any special or new attachment support mechanism other than those techniques presently being used in printed circuit card methods.

OBJECTS OF THE INVENTION

An object of the invention is to present a hybrid connector which connects both electrical and optical conducting connectors to printed circuit cards.

A second object of the invention is to provide for normal printed circuit card installation and removal of fiber optic interconnects from standard card cages or mother boards without threading or other special engaging mechanisms.

A further objective of the invention is to present a new connector which allows the use of integrated optic circuits in a printed circuit card in a manner similar with electronic circuits methods used at the present time.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
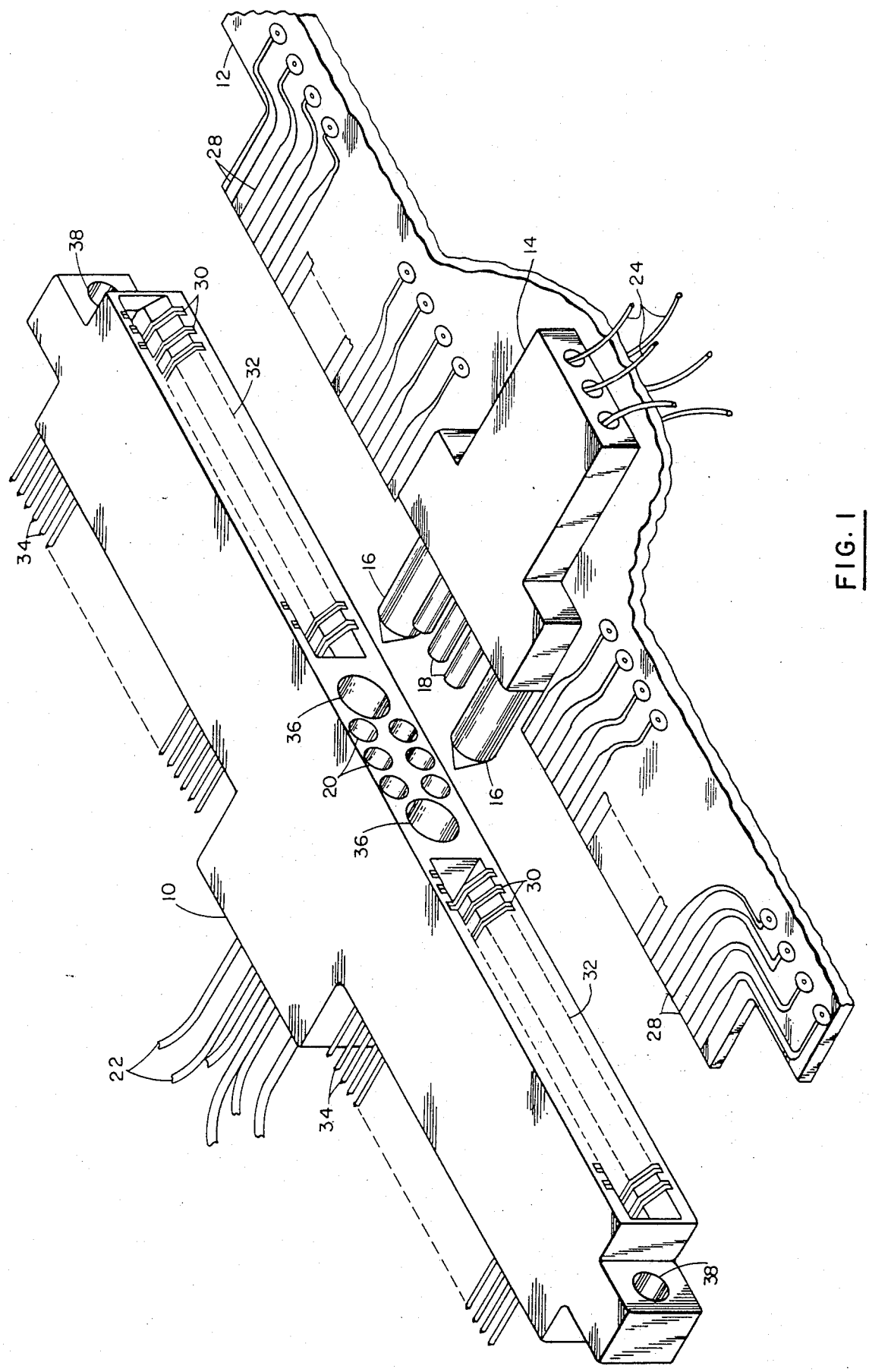
FIG. 1 shows a male and female combination of the printed circuit card hybrid fiber optic connector.

FIG. 1 shows a preferred embodiment of the hybrid connector. In this embodiment a molded body 10 provides a housing for female contact inserts for both fiber optic and electrical connections.

A plurality of female electric connectors 30 can be removably mounted in a slot 32. As part of housing 10 a plurality of female fiber optic contact inserts 20 are also removably mounted within housing 10. Fiber optic contact inserts which can be removably installed in a connector already exist in forms that can be press fitted into holes prepared to receive them, by attachment with crimp bushings or sleeves, etc. An example of such existing fiber optic connectors are the cable termination ferrules and/or TO-18 packaged devices sold under the trademark of AMP.

A plurality of fiber optic cables 22 are shown which connect to the fiber optic female contact inserts 20. Also shown is a plurality of electrical pin type contacts 34 which attach to internal female electrical contacts 30. Two guide holes 36 are constructed in housing 10 to receive mating male guide pins 16 from the printed circuit board portion of the connector. These guide pins serve to align the female and male portions of the connector during connection.

A printed circuit board 12 is shown with the male half of the connector containing a plurality of electrical contacts 28 and a plurality of fiber optic male contact inserts 18. These fiber optic contact inserts, as mentioned earlier, already exist in forms that can be installed into holes or bushings prepared to receive them. The male fiber optic contact inserts 18 are installed in a housing 14 which is part of the printed circuit card. Clearly housing 14 may be mounted by use of set screws, special brackets, or, possibly, by being molded integrally to the printed circuit card. A plurality of fiber optic cable pigtails 24 connect the male contact inserts with various fiber optic components or transducers mounted upon the printed circuit card.

The electrical conducting contacts 28 are standard metallic deposited contacts used in printed circuit techniques. They provide an electrical conducting contact with the female electrical contacts 32 which connects the electronic circuits constructed on the printed circuit card with outside electrical terminals or equipment.

The housing 14 is also fitted with at least two guide pins 16 which align with guide holes 36 and hold the connectors in alignment when connected together. Clearly, printed circuit card 12 may be of any standard type designed to fit a predetermined standard rack.

The female housing 10 of the connector is molded or otherwise constructed as a unitary structure which is compact, saves weight, and easily allows for the hybrid connection of electrical and optical connectors to a standard printed circuit card. The connector is capable of utilizing standard materials and standard female and male contact inserts for the fiber optic connection portion, as well as standard types of electrical contact systems.

At the choice of the designer, fiber optic female and male contact inserts may be selectively interchanged in that they may be removed and installed in either the female housing 10 or the male housing 14. A similar capability clearly exists with the electrical connectors chosen.

The force necessary to hold the female housing 10 in connection with the male half of the connector and the printed circuit board 12 can be obtained by using friction contact between the male and female electrical contacts and friction fits between guide pins 16 and guide holes 36. Also possible is the incorporation of connection holes 38 in the female part by which this part of the connector can be firmly fastened by machine bolts or latches to the printed circuit card, or to the printed circuit card cabinet.

Figure 3:
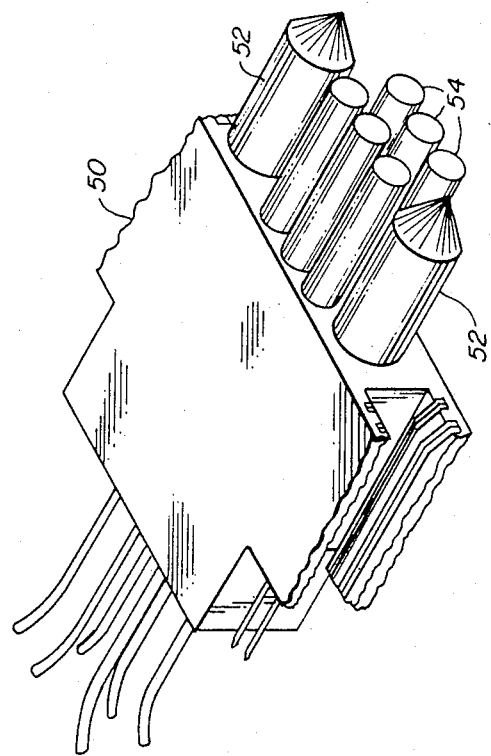
FIG. 3 is an isometric view of an alternate embodiment of applicant's invention wherein the molded body 10 illustrated in FIG. 1 is fitted with male fiber optic contacts instead of the female fiber optic contacts illustrated in FIG. 1.
Figure 2:
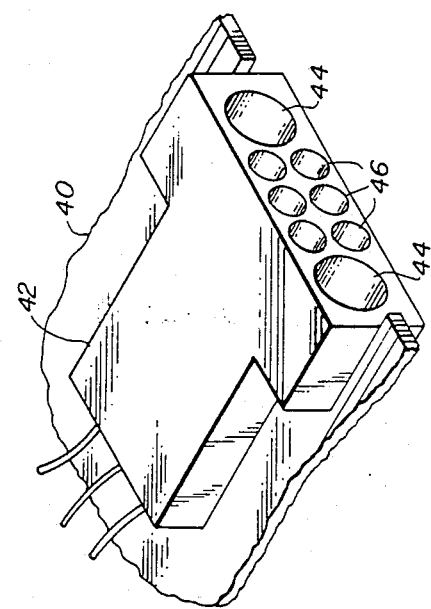
FIG. 2 is an isometric view of an alternate embodiment of the present invention wherein the printed circuit board illustrated in FIG. 1 is fitted with female fiber optic contacts instead of the male fiber optic contacts illustrated in FIG. 1.

Clearly, the connector can equivalently be constructed with female type contacts mounted on the printed circuit card and male type contacts incorporated in the separate molded body 10. Likewise, the location and roles of the guide pins 16 and holes 36 can be interchanged or otherwise altered to fit the situation. FIGS. 2 and 3 illustrate these alternate embodiments of the present invention. Particularly, referring to FIG. 2, the printed circuit board illustrated as component 12 in FIG. 1 is illustrated in FIG. 2 as component 40. Housing 42 corresponds to housing fixture 14 in FIG. 1 and can change optical female guide holes 44 and optical female contacts 46. In FIG. 3, molded body 50 corresponds to the molded body 10 illustrated in FIG. 1. FIG. 3 illustrates how male guide pins 52 can be utilized in conjunction with molded body 50 and that optical male contacts 54 can be utilized as well. It should thus be appreciated that the male and female optical contacts 18 and 20 illustrated in FIG. 1 can be interchanged as is illustrated by components 46 and 54 illustrated in FIGS. 2 and 3, respectively.

Obviously, many other modifications and variations of the present invention are possible in the light of the above teachings. It is therefore to be understood that within the scope of the appended claims the invention may be practiced otherwise than as specifically described.

What is claimed is:

1. A hybrid connector for fastening both electrical and light conductors to a printed circuit board which comprises:

holding means fixed as an input edge of the printed circuit board for holding in a preselected arrangement a first combination of a plurality of fiber optic contact inserts and electrical contacts, said first combination of contacts being arranged to serve as optical and electrical signal inputs for the circuitry on the printed circuit card; said holding means including a housing which is rigidly fixed to the printed circuit board, said housing containing a portion of the fiber optic inserts and holding them in said preselected arrangement; and maintaining means for maintaining in a preselected arrangement a second combination of a plurality of fiber optic contact inserts and electrical contacts which connects said second combination of contacts to said first combination of contacts on the holding means, said first and second combination sets of contacts mating in a manner for transmitting electrical and optical signals through the connection, and said maintaining means making a releasable connection with the holding means.

2. A hybrid connector according to claim 1 wherein the maintaining means comprises:
a unitary molded housing containing a preselected arrangement of said second combination of a plurality of optical insert contacts and electrical contacts.

3. A hybrid connector according to claim 2 wherein the maintaining means further includes:
a plurality of guide pins.

4. A hybrid connector according to claim 3 wherein the holding means further includes:
a plurality of receiving holes for releasably accepting and retaining the guide pins when inserted.

5. A hybrid connector according to claim 4 wherein:
the second combination of a plurality of optical insert contacts and electrical contacts within the maintaining means are male type connectors; and
the first combination of a plurality of optical insert contacts and electrical contacts are female type connectors.

6. A hybrid connector according to claim 2 wherein the holding means further includes:
a plurality of guide pins.

7. A hybrid connector according to claim 6 wherein the maintaining means further includes:
a plurality of receiving holes for releasably accepting and retaining the guide pins when inserted.

8. A hybrid connector according to claim 7 wherein:
the second combination of a plurality of optical insert contacts and electrical contacts within the maintaining means are male type connectors; and the first combination of a plurality of optical insert contacts and electrical contacts are female type connectors.

9. A hybrid connector according to claim 1 wherein the optical insert contacts further comprise:
   removable and replaceable fiber optic contact inserts thereby allowing repair and replacement in the holding means.

* * * * *